Jan. 6, 1942.  E. LÖPP  2,268,666

METHOD OF SEALING GLASS AND CERAMIC MATERIAL TOGETHER

Filed Jan. 27, 1939

Inventor:
Edmund Löpp
by E. D. Kinney
Att'y

Patented Jan. 6, 1942

2,268,666

UNITED STATES PATENT OFFICE 2,268,666

METHOD OF SEALING GLASS AND CERAMIC MATERIAL TOGETHER

Edmund Löpp, Berlin, Germany, assignor to C. Lorenz Aktiengesellschaft, Berlin-Tempelhof, Germany, a company Application January 27, 1939, Serial No. 253,165
In Germany January 27, 1938

3 Claims. (Cl. 49—81)

In the manufacture of vacuum vessels for electron tubes and the like it is well known to employ ceramic material. For instance, it is customary to make the wall of such vessels in part of this material.

In this connection difficulties are encountered if glass portions of the vessel are to be sealed to ceramic parts thereof, because the differences between the coefficients of expansion of the respective parts are such in general that these, when heated or cooled, will expand differently, thus causing either the glass or the ceramic material to crack. To employ materials whose coefficients of expansion are as far as possible similar to each other is in most cases not sufficient, as these coefficients in their turn depend on temperature conditions in a manner to differ from one another also in this respect.

In accordance with the invention glass and ceramic material are sealed together by uniting the glass with thin-walled parts of the ceramic material. In this way, whenever the sealing spot undergoes variations of temperature, there will be a certain freedom of movement provided for the ceramic material which thus will not be liable to cracking.

Another special advantage is that the respective parts are easy to seal together, since only thin-walled parts, that is, parts of comparatively small volume, are to be heated, whereas the main portion of the ceramic body will remain almost cold.

In the following description the invention is explained as employed in the manufacture of the vacuum vessel of an electron tube, reference being had to the accompanying drawing, in which—

Figure 1:
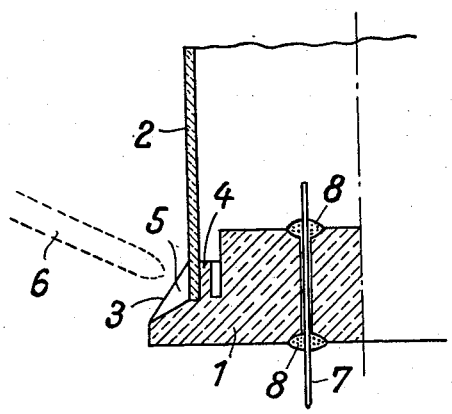
Figure 2:
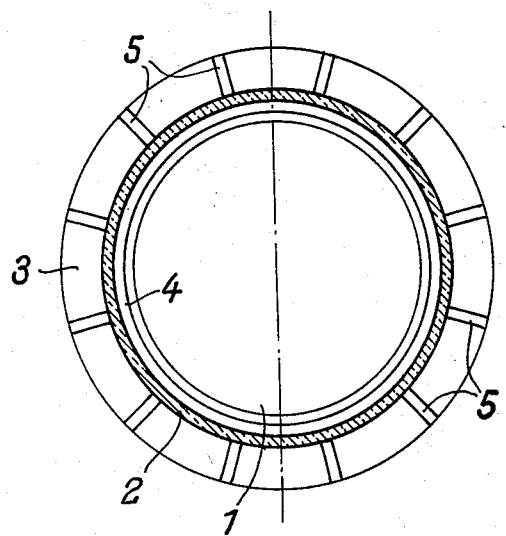

Fig. 1 is a fragmentary sectional view of such vessel, while Fig. 2 shows a partial section thereof, taken at right angles to Fig. 1.

The vessel here represented by way of example comprises a ceramic body 1, arranged as a cover, and a glass bulb 2. These are the parts to be sealed together.

In accordance with the invention body 1 is formed with two thin-walled annular edge portions or projections 3, 4 which are in the nature of ribs and between which the bulb 2 is inserted. These edge portions may be produced by means of a turning lathe, for instance. In the preferred form shown edge portion 3 is provided with a tapered cross-section, tapering down longitudinally of the tube, whereby a relatively flexible portion thereof is adjacent the bulb 2. In order further to improve the sealing so obtained, part 3 may be provided with radial slots 5 arranged to subdivide it in sections adapted to move outward in the direction of radii, the ceramic material or glass bulb thus being prevented from cracking.

Preferably, the ceramic body 1 which is relatively massive with respect to said annular portions, is made of a porous material so that it will be intimately united with the glass bulb 2.

In order to obtain a sealing of this kind, bulb 2 is inserted between the edge portions 3, 4, whereupon these are heated by means of an acute flame 6 and interconnected thereby in a manner to ensure vacuumtightness.

This mode of sealing provides for heating the main portion of body 1 to such extent only as not to affect the sealing means 8 by which a leading-in conductor 7, for instance, is held in place. This conductor may serve in well-known manner to carry electrodes arranged in the vacuum vessel.

The invention is not restricted to the manufacture of vacuum vessels for electron tubes, but may be used whenever glass and ceramic material are to be sealed together.

What is claimed is:

1. A method of sealing a cylindrical glass body to a ceramic cover which comprises forming annular grooves in said cover, said grooves lying adjacent each other and forming thin-walled annular portions therebetween, forming radial slots in one of said thin-walled annular portions, inserting one end of said body in one of said grooves between said thin-walled portions and sealing said body to said annular portions.

2. A method of sealing a cylindrical glass body to a ceramic cover which comprises forming annular grooves in said cover, said grooves lying adjacent each other and forming thin-walled annular portions therebetween, forming radial slots in one of said thin-walled annular members, forming at least one of said thin-walled annular portions with a tapered cross-section, inserting one end of said body in one of said grooves between said thin-walled portions, and sealing said body to said annular portions.

3. A method of sealing a cylindrical body to a ceramic cover which comprises forming annular grooves in said cover, said grooves lying adjacent each other and forming thin-walled annular portions therebetween, forming radial slots in one of said thin-walled annular portions, inserting one end of said body in one of said grooves between said thin-walled portions and heating said portions at least to the point at which the glass will fuse whereby said body is sealed to said portions.

EDMUND LOPP